(12) United States Patent
Novak

(10) Patent No.: US 6,478,136 B2
(45) Date of Patent: Nov. 12, 2002

(54) METHOD AND APPARATUS FOR AUTOMATICALLY TRANSPORTING AND PRECISELY POSITIONING WORK PIECES AT PROCESSING STATIONS

(75) Inventor: W. Thomas Novak, Hillsborough, CA (US)

(73) Assignee: Nikon Corporation, Tokyo (JP)

( * ) Notice: Subject to any disclaimer, the term of this patent is extended or adjusted under 35 U.S.C. 154(b) by 9 days.

(21) Appl. No.: 09/755,099

(22) Filed: Jan. 8, 2001

(65) Prior Publication Data

US 2002/0088685 A1 Jul. 11, 2002

(51) Int. Cl.⁷ .................... B65G 37/00; B65G 43/00; B65G 43/08; B65G 49/02
(52) U.S. Cl. ................ 198/346.1; 198/468.6; 414/416.09; 269/21; 269/56
(58) Field of Search ............... 198/346.1, 468.6; 269/21, 56; 414/416.09, 811

(56) References Cited

U.S. PATENT DOCUMENTS

| | | | |
|---|---|---|---|
| 4,461,567 A | | 7/1984 | Mayer |
| 4,492,459 A | | 1/1985 | Omata |
| 4,566,726 A | | 1/1986 | Correnti et al. |
| 4,695,215 A | | 9/1987 | Jacoby et al. |
| 4,813,846 A | | 3/1989 | Helms |
| 5,085,558 A | | 2/1992 | Engelbrecht |
| 5,260,771 A | | 11/1993 | Komoriya et al. |
| 5,374,829 A | * | 12/1994 | Sakamoto et al. ..... 250/453.11 |
| 5,376,212 A | | 12/1994 | Saiki |
| 5,432,608 A | | 7/1995 | Komoriya et al. |
| 5,471,279 A | * | 11/1995 | Takizawa .................... 269/21 |
| 5,509,771 A | | 4/1996 | Hiroki |
| 5,617,182 A | | 4/1997 | Wakamoto et al. |
| 5,625,436 A | | 4/1997 | Yanagihara et al. |
| 5,788,454 A | * | 8/1998 | Thompson et al. ......... 414/811 |
| 5,803,797 A | * | 9/1998 | Piper .......................... 125/12 |
| 6,325,057 B1 | * | 12/2001 | Farnworth ................... 125/12 |

* cited by examiner

Primary Examiner—Christopher P. Ellis
Assistant Examiner—Gene O Crawford
(74) Attorney, Agent, or Firm—Finnegan, Henderson, Farabow, Garrett and Dunner, L.L.P.

(57) ABSTRACT

In a system and method for automatically transporting and precisely positioning a work piece at a station for processing, a relatively low precision transport mechanism is utilized to transfer a chuck that holds the work piece to and from the processing station. Notwithstanding the use of the low precision transport mechanism, the chuck can be precisely positioned at the processing station by using a quasi-kinematic coupling. More specifically, the chuck is precisely located at the coupling by engaging pre-defined indexing notches at the coupling. The chuck is securely held against the coupling at the processing station by suction. The coupling may be supported on a precision stage, which is configured to further position the chuck with the work piece thereon with high precision for processing at the processing station. In another aspect of the invention, the chuck is configured to securely hold a smooth surface of the work piece by suction. In a further aspect of the invention, the transport mechanism may be configured to transfer the chuck between multiple processing stations. Each processing station has a similar quasi-kinetic coupling. The coupling may be supported on a single precision stage, which further positions the chuck with relatively high precision with respect to the processing apparatus.

17 Claims, 10 Drawing Sheets

METHOD AND APPARATUS FOR AUTOMATICALLY TRANSPORTING AND PRECISELY POSITIONING WORK PIECES AT PROCESSING STATIONS

FIELD OF THE INVENTION

The invention relates to systems for automatically transporting and positioning work pieces for processing at processing stations, particularly to systems for automatically transporting and positioning planar or disk-shaped work pieces at processing stations, and more particularly to systems for automatically transporting and precisely positioning disk-shaped substrates such as a semiconductor wafers at multiple exposure stations.

BACKGROUND OF THE INVENTION

In the production of certain articles (e.g., semiconductor devices), the associated work pieces must be precisely positioned with respect to the processing apparatus (e.g., a projection mask exposure apparatus). Further, the production of certain articles may involve sequential processing of work pieces at multiple processing stations. The work pieces may be transported between stations, either manually or using an automated transport device. For certain precision processing, it may require that the work piece be precisely positioned with respect to the processing apparatus at each processing station.

Certain transport systems typically move the work piece to different processing locations, and if a precision alignment is required, the work piece is realized. Depending on the precision required, this realignment may take time and involve costly apparatus. Other transport systems mount the work piece on a precision stage system and transport the work piece to various process locations on the precision stage. This technique requires a long stroke, precision stage, which is generally more expensive than a short-stroke stage.

While automated transport devices provide repeatable, systematic results (as compared to manual transports that inevitably involve some human errors), they typically include a complex structure of precision electro-mechanical components. In order to achieve a marginal improvement in the precision of an automatic transport device, significant development efforts and costs are required.

It is therefore desirable to develop a work piece transport system that generally is simple in structure and yet capable of positioning work pieces with high precision, and that more specifically uses an imprecise low-cost stage to move a work piece attached to a chuck or work piece holder and a registration method to precisely and repeatedly locate the chuck and work piece at multiple locations.

SUMMARY OF THE INVENTION

The invention provides a system and method for automatically transporting and precisely positioning a work piece at a station for processing. A relatively low precision transport mechanism is utilized to transfer a chuck that holds the work piece to and from the processing station. According to one embodiment of the invention, notwithstanding the use of the low precision transport mechanism, the chuck can be precisely positioned at the processing station by utilizing a quasi-kinematic coupling. More specifically, the chuck is precisely located at the coupling by engaging pre-defined indexing notches at the coupling. In the illustrated embodiment, the chuck is securely held against the coupling at the processing station by suction. The coupling may be supported on a precision stage, which is configured to further position the chuck with the work piece thereon with high precision for processing at the processing station.

In another aspect of the invention, the chuck is configured to securely hold a smooth surface of the work piece by suction. In the illustrated embodiment, the chuck is configured to securely hold a planar substrate. The chuck may be configured to hold work pieces of other configurations without departing from the scope and spirit of the invention.

In a further aspect of the invention, the transport mechanism may be configured to transfer the chuck between multiple processing stations. Each processing station has a similar quasi-kinetic coupling. The coupling may be supported on a single precision stage, which further positions the chuck with relatively high precision with respect to the processing apparatus.

In a further aspect of the invention, the processing stations are projection exposure stations in connection with wafer processing. The wafer is securely held on the chuck by suction. The transport mechanism moves the chuck from one exposure station to another to subject the wafer to a desired exposure sequence.

DETAILED DESCRIPTION OF THE INVENTION

The following description is of the best presently contemplated mode of carrying out the invention. This description is made for the purpose of illustrating the general principles of the invention and should not be taken in a limiting sense. The scope of the invention is best determined by reference to the appended claims.

The transport system of the invention is described in reference to wafer exposure processing. However, it is understood that the invention may be easily adapted for use in other systems in which precise positioning of a work piece is desirable without departing from the scope and spirit of the invention.

By way of background, the production of integrated circuit devices generally involves exposing photosensitized semiconductor wafer surfaces to illuminations that are directed through one or more masks in a projection apparatus. The exposure process may involve a series of exposures carried out in a projection mark alignment and exposure system, such as a step-and-repeat type system. It is extremely important that for each exposure, the wafer must be precisely positioned with respect to the optical axis of the projection optics in the projection system in order to ensure correct registration of each successive image. Further, the wafer surface should be positioned in the image plane of the projection optics in order to receive a sharp image of the mask pattern.

The wafer is typically securely held on a chuck that is supported on a precision stage. The precision stage is adjustable to precisely align the wafer with respect to the successive images of the projection mask. Subsequent development and chemical treatment of the wafer establish an array of circuit elements represented by conductive and nonconductive areas formed at predetermined locations on the wafer surface. It can be appreciated that the formation of a higher density of circuit elements on a wafer requires higher precision in wafer alignment.

For some applications, a given wafer may be subject to exposures at multiple stations. For similar reasons given above, precise positioning of the wafer with respect to the projection optics at each exposure station is essential. To accomplish this task, the transport system of the invention may be utilized to transport and precisely position the wafer from one exposure station to another. In the illustrated embodiment herein, the wafer to be processed is securely held in a single chuck. The chuck having the wafer thereon is moved by a chuck transport mechanism between a calibration station and a number of processing stations at a precision stage.

Figure 1:
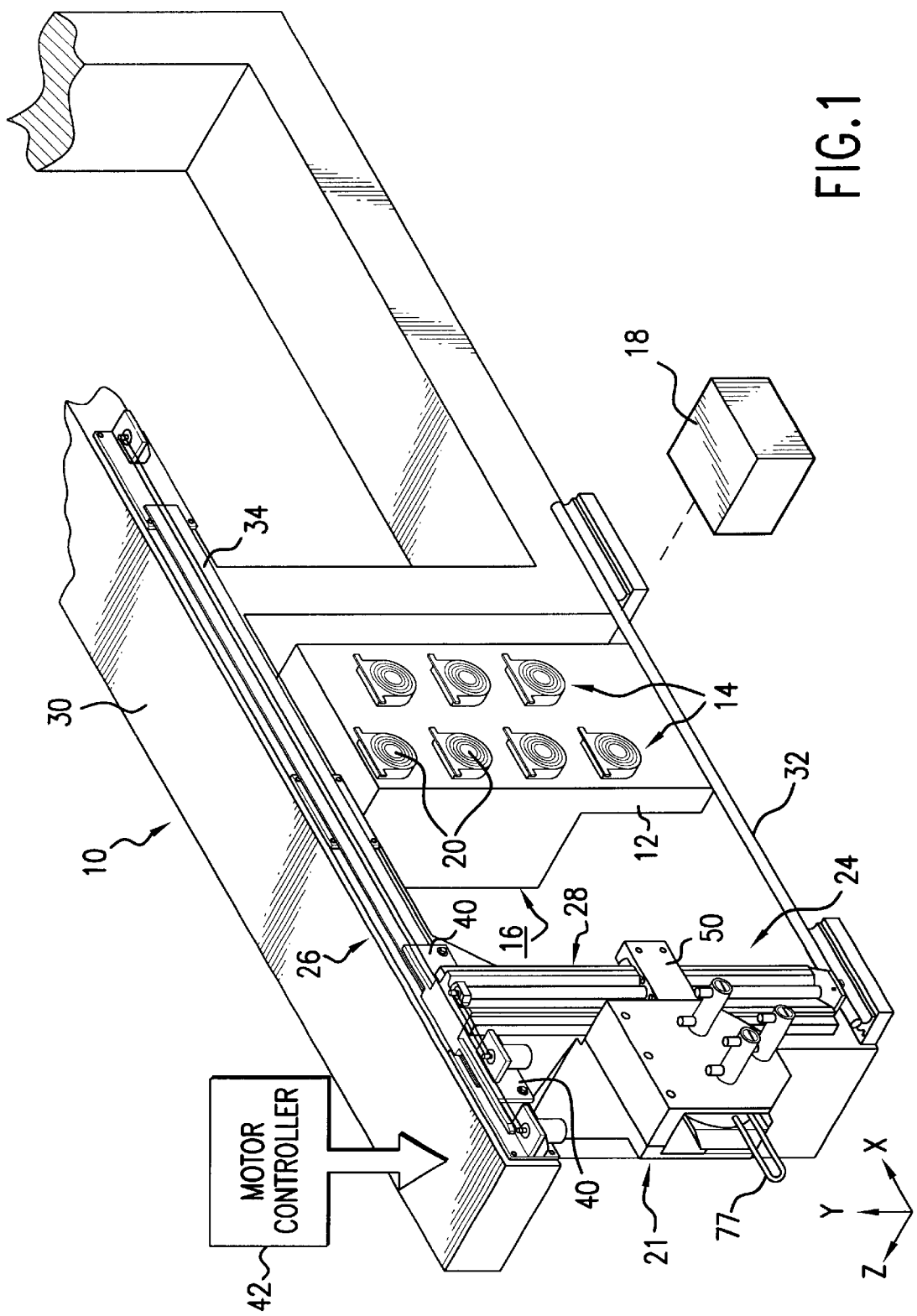
FIG. 1 is a simplified perspective view of the chuck transport mechanism in accordance with one embodiment of the invention, and its relation to the precision stage.

FIG. 1 shows the overall configuration of the chuck transport mechanism 10 in accordance with one embodiment of the invention, and its relation to the precision stage 12. At the precision stage 12, there are defined several processing stations 14 (each defined by a coupling 20 as described more fully below). In the illustrated embodiment, there are seven processing stations 14 defined at the precision stage 12. A different number of processing stations may be defined depending on the scale of the precision stage and the particular processing application intended to be handled by the system. The precision stage 12 is coupled to conventional precision servo motors and actuators (schematically shown at 16) which are used to precisely move and position the precision stage 12 with respect to the exposure apparatus (schematically shown at 18). The movements of the precision stage 12 may include linear translations along three orthogonal axes (X, Y and Z) and rotations about these axes. The positioning mechanism for the precision stage 12 in and by itself does not form part of the inventive concept herein. The detail of such is therefore omitted herein so as not to obscure the description of the invention. It may comprise any conventional components configured in a manner to allow the precision movements of the precision stage. The exposure apparatus 18 may comprise a number of known projection optical systems, each associated with a processing station 14.

As will be described more fully hereinafter, at the respective processing stations 14, a vacuum coupling 20 is provided for coupling a chuck 22 to the precision stage 12, thereby presenting the wafer 23 for exposure at the respective processing stations 14 (see FIG. 2). A calibration station 21 is provided for initially calibrating the location of the wafer surface in reference to the chuck 22.

In accordance with one embodiment of the invention, the chuck transport mechanism 10 essentially comprises an X-Y positioner 24 having accessibility to all the processing stations 14 (FIG. 2) and the calibration station 21 (FIG. 1). It is understood that the X-Y positioner 24 may be configured to operate based on a different coordinate system (e.g., polar coordinates) without departing from the scope and spirit of the invention. More specifically, the X-Y positioner 24 includes two main subassemblies, a horizontal drive assembly 26 and a vertical drive assembly 28. Referring also to FIG. 3, the horizontal drive assembly 26 is attached to a frame 30 which surrounds the front of the precision stage 12 on which the processing stations 14 are located. The horizontal drive assembly 26 has a horizontal rail 32 that has a circular cross-section (e.g., a precision ground shaft Thomson PD 60-3/4) which runs along the base of the frame 30 (see also FIG. 4). The rail 32 supports the bottom end of the vertical drive assembly 28. The horizontal drive assembly 26 also has a horizontal rail 34 (e.g., a THK 2042T rail) attached to the top of the frame 30. The top end of the vertical drive assembly 28 is coupled to the top rail 34. A DC stepper motor 36 (e.g., a 23D6108A motor by API Gettys, Inc.) is attached to the top of the frame 30, which drives a chain belt 38 (e.g., a BERG 3CCF chain belt) that is coupled to a pair of slides 40 at the top end of the vertical drive assembly 28. A controller 42 controls the motor 36 to drive the vertical drive assembly 28 to slide along the horizontal rails 32 and 34, moving in the X-direction. In addition to the positional information provided by the motor controller 42, limit switches (not shown; e.g., optical switches or reed switches) may be positioned along the rails 32 and 34 to identify the position of the vertial drive assembly (e.g., at a home position) and/or delineate the boundary of its travel.

Figure 5:
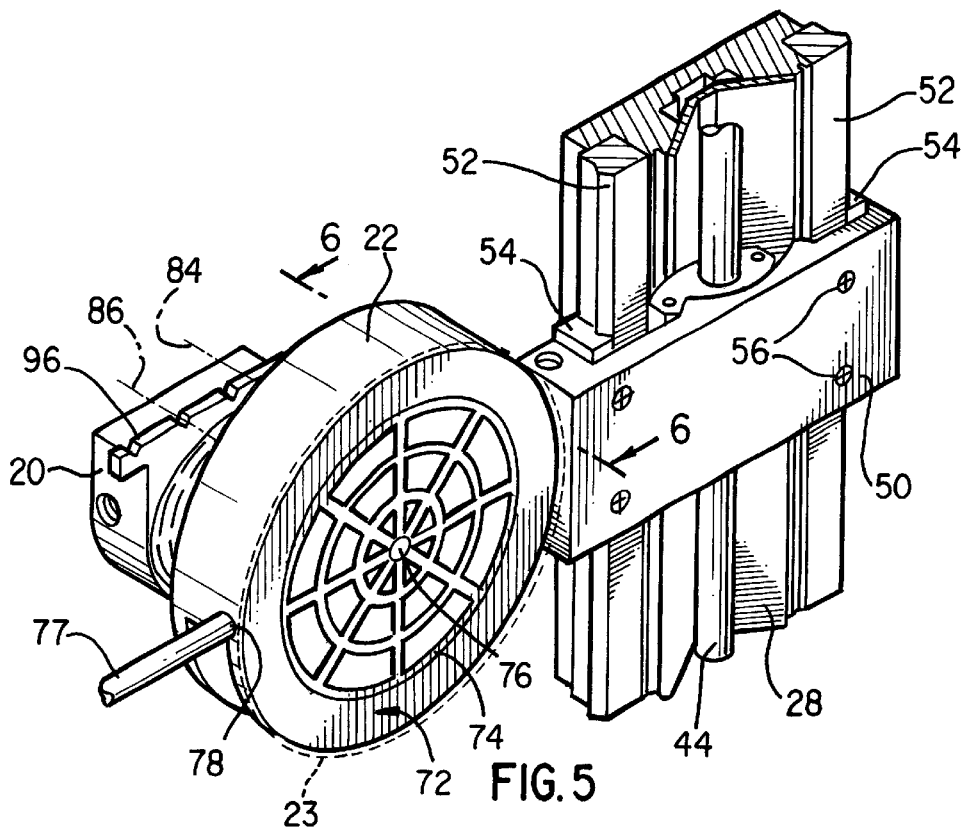
FIG. 5 is an enlarged view of the chuck being supported by the lifter for placement onto a vacuum coupling at a process station on the precision stage.

The vertical drive assembly 28 consists of a lead screw 44 (e.g., a THK DCM14 lead screw) supported at its ends by bearings 46 and 47 (e.g., a BERG 9100K bearing 46 at the top end and a 7P6__F1216 bearing 47 at the bottom end of the lead screw 44). The lead screw 44 moves a lifter 50 in a vertical (Y) direction along vertical rails 52 (e.g., a THK HR2042T rail). Referring also to FIG. 5, the lifter 50 is guided on either side using complementary sliders 54. The sliders 54 can be preloaded against the rails by either moving the vertical rails 52 further apart or setting the sliders 54 closer to each other using the set screws 56 on the lifter 50.

Figure 4:
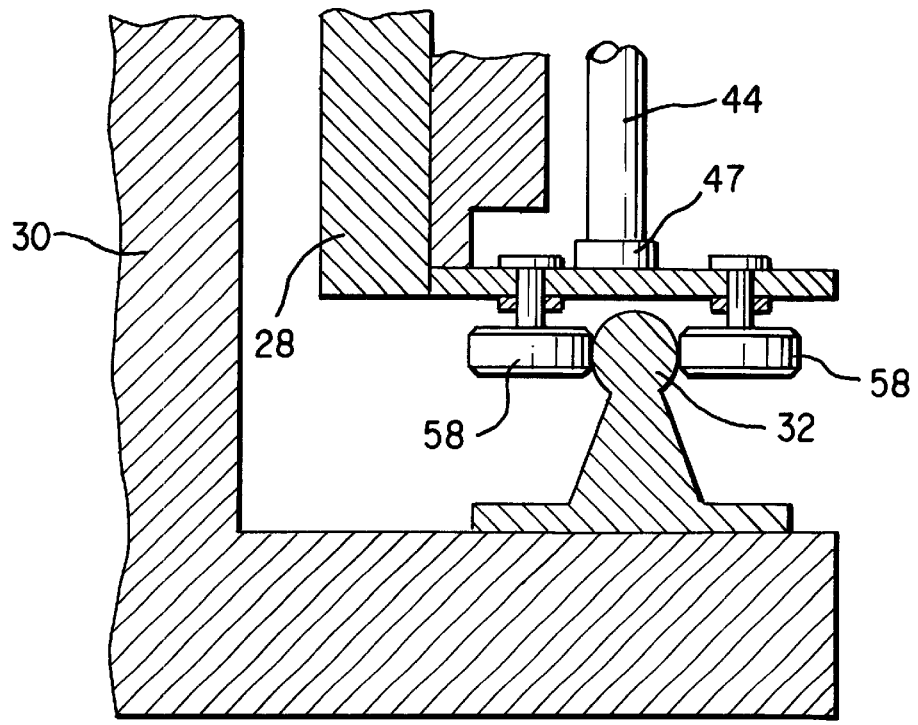
FIG. 4 is a sectional view of the base of the X-Y positioner taken along line 4—4 in FIG. 3.

Referring to FIG. 4, the bottom end of the vertical drive assembly 28 has a pair of eccentric (i.e., off-centered) cam followers 58 (e.g., a THK CFH10 cam follower). These are preloaded against the rail 32. The cam followers 58 slide along the rail 32 as the vertical drive assembly 28 is moved in a horizontal direction. The cam followers 58 also prevent the entire vertical drive assembly from hinging about its mounting to the top rail 34 of the horizontal drive assembly 26.

Referring to FIG. 3, the lead screw 44 is driven by a stepper motor 60 (e.g., a 23D6108A motor by API Gettys, Inc.) using a chain belt 62 (e.g., a BERG 3CCF belt of a 4 mm pitch) and a sprocket 64 (e.g., a BERG 24B4-20 sprocket) at the top end of lead screw 44. As the lead screw 44 is rotated by the sprocket 64 and belt 62, the lifter 50 moves vertically. Alternatively, the vertical and horizontal drive assemblies (26 and 28) may be configured with roller bearings instead of the slide rails 932, 34 and 52), to facilitate horizontal movements of the vertical drive assembly 28 and vertical movements of the lifter 50. While the vertical position of the lifter may be determined by the motor controller 42, limit switches (not shown; e.g., reed switches or optical switches) may be placed along the rails 52 to positively identify the vertical position of the lifter 50 (e.g., at a home position) and/or delineate the boundary of its travel.

Referring to FIG. 3, the lifter 50 has a slender finger 66 extending horizontally from its base. The finger 66 has beveled top longitudinal edges 68. A pin 70 extends from the top of the finger 66. The interaction of the finger 66 and the wafer chuck 22 will be explained below after a discussion of the structure of the chuck 22.

Figure 7:
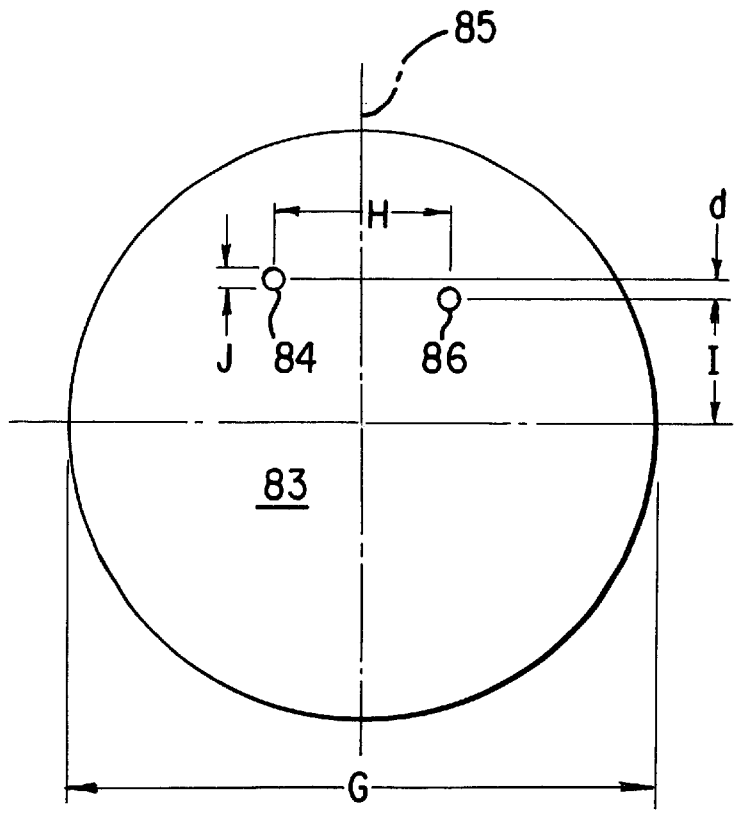
FIG. 7 is a rear view of the chuck.

The detail structure of the chuck 22 is shown in FIGS. 5 and 7. The chuck 22 may be made of stainless steel or other suitable machinable materials. The chuck 22 has a generally circular cylindrical body. The flat circular front face 72 of the chuck 22 should be sized to accept the largest size wafer desired. On the front face 72, a network of surface grooves 74 are provided. In the specific embodiment illustrated, the grooves 74 are configured in a web-like fashion. Specifically, the grooves 74 are arranged in regularly spaced concentric rings that are interconnected by radial grooves originating from a plenum 76 at the center of the circular face 72. An outlet 78 on the side of the chuck 22 communicates with the center plenum 76 via an internal passage (not shown). A vacuum hose 77 is connected to the outlet 78. As will be explained in greater details below, after a wafer has been placed on the face 72 of the chuck 22 and upon drawing air from the groove 74 through the outlet 78, a vacuum is created at the grooves 74. The vacuum suction at the grooves 74 holds the wafer 23 securely against the face 72 of the chuck 22.

Figure 6:
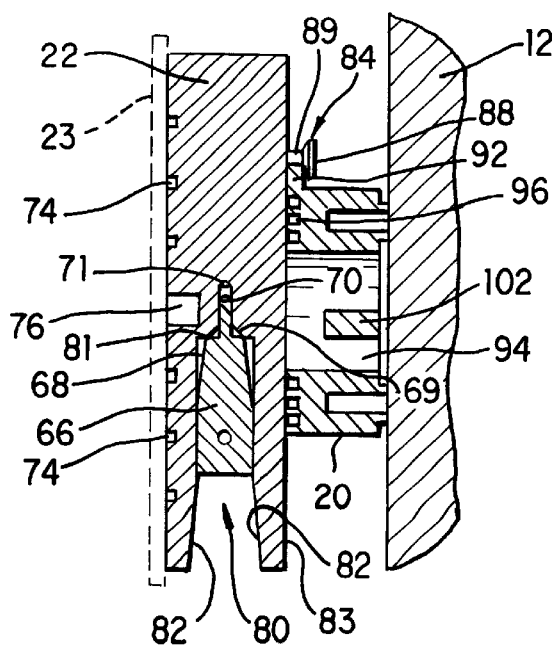
FIG. 6 is a sectional view of the chuck taken along line 6—6 in FIG. 5.

As more clearly shown in FIG. 6, the bottom half of the body of the chuck 22 has an inverted U-shaped cavity 80. The bottom surface 81 of this U-shaped cavity 80 is flat, matching the flat top surface of the finger 66 of the lifter 50. The inner edges 82 of the U-shaped cavity 80 are beveled to facilitate insertion of the finger 66 of the lifter 50 (see discussion below). The width of the U-shaped cavity 80 is sized with sufficient clearance to accept the finger 66 of the lifter 50. At the center of the flat surface 81 (and along the vertical diametrical axis of the chuck 22), a retaining hole 71 is provided which is sized to accept the pin 70 on the finger 66. The edge 69 of the retaining hole 71 is beveled to facilitate insertion of the pin 70 into the retaining hole.

The finger 66 on the lifter 50 is used to lift and support the chuck 22 when the chuck is moved by the lifter 50. Specifically, as the lifter 50 is driven by the vertical drive assembly 28 to move upwards, the finger 66 is raised into the U-shaped cavity 80, lifting the chuck 22. The pin 70 on the finger 66 is controlled to engage the retaining hole 71. The pin 70 securely retains the chuck 22 on the finger during movement of the lifter 50 as driven by the horizontal and vertical drive assemblies 26 and 28. The beveled edges (68, 82) on the finger 66 and the U-shaped cavity 80 facilitate the insertion of the finger 66 into the cavity 80.

Referring also to FIG. 7, on the flat rear face 83 of the chuck 22, two retaining pins 84 and 86 are provided. Each pin has a beveled head 88. The lateral positions of the pins 84 and 86 are symmetrically about the vertical diametrical axis 85 of the rear circular surface 83 of the chuck. However, the vertical positions of the pins 84 and 86 are offset by a small distance d. The purpose of this offset d will become clear when the structure of the processing stations 14 are discussed below.

Figure 8:
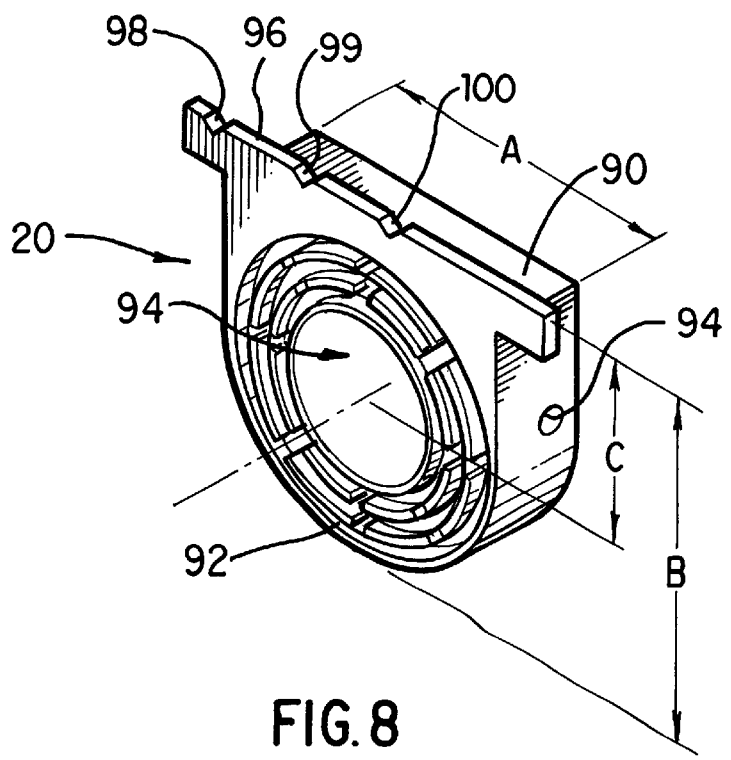
FIG. 8 is a perspective view of the vacuum coupling at a processing station.

In the illustrated embodiment, the precision stage 12 has seven processing stations 14, each defined by a vacuum coupling 20. The vacuum coupling 20 may be made of Invar, or other stable material. Referring to FIG. 8, the body of the vacuum coupling 20 is generally cylindrical, having a flat side 90 at the top side of the cylinder (in reference to the orientation of the vacuum coupling 20 shown in FIG. 8). An annulus of surface grooves 92 surrounds a hollow center 94 of the vacuum coupling 20. Similar to the chuck 22, the grooves 92 are used to provide vacuum suction for securely holding a surface against the grooves. In the illustrated embodiment, the grooves 92 are configured in regularly space concentric rings that are interconnected by radial grooves. An outlet 94 at the side of the vacuum coupling 20 is in fluid communication with the grooves 92 via an internal passage (not shown). The outlet 94 is connected to a vacuum hose (not shown) by means of a suitable coupling (not shown).

A flat reference bar 96 is provided at the top edge of the vacuum coupling 20 (in reference to the orientation of the vacuum coupling shown in FIG. 8). Several V-shaped indexing notches 98, 99 and 100 are provided along the reference bar 96. The notches 98–100 pre-defines the exact positions available to the chuck 22 with respect to the vacuum coupling 20 at each processing station 14. As will be described more fully below, by locating the pin 86 on the rear surface 83 of the chuck 22 at one of the notches 98–100, one of three positions may be selected in the illustrated embodiment. A greater number of positions may be made available by providing more indexing notches on the reference bar 96. The notches 98–100 are sized to positively locate the pin 86 to define the lateral position of the chuck 22 and prevent side-slip of the chuck 22 with respect to the vacuum coupling 20.

Figure 9A:
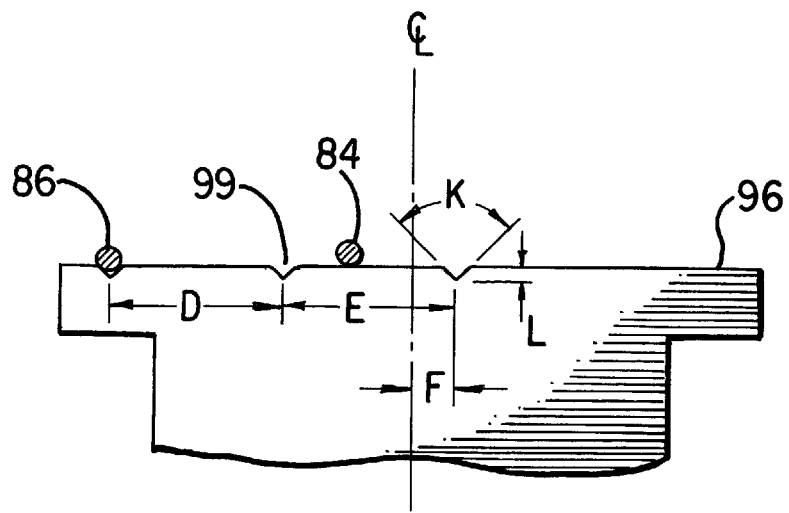
FIGS. 9A–C show the positioning of the chuck at pre-defined notches at the vacuum coupling.
Figure 9B:
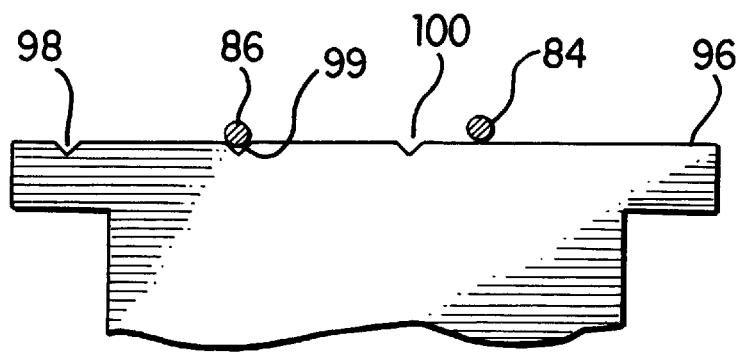
Figure 9C:
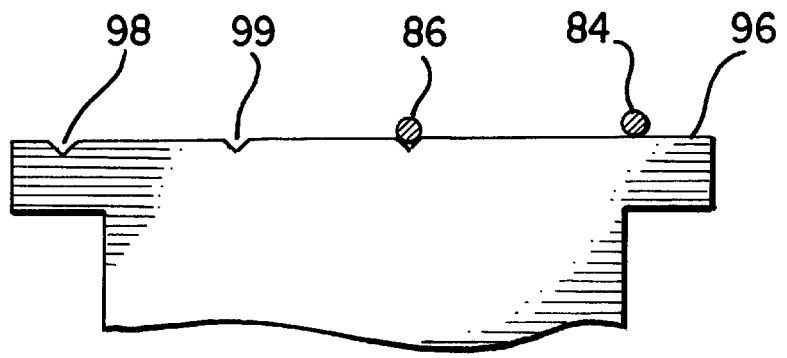

Referring to FIGS. 9A to 9C, the exact positions of the chuck 22 at each processing station 14 will become clear. It is noted that the location of the notches 98–100 are not symmetrical with respect to the vacuum coupling 20, and the spacing between any two adjacent notches are not same as the spacing between the pins 84 and 86. The result of this is that only one of the pins 84 and 86 can sit in a notch when the chuck 22 is hung on the vacuum coupling 20. The other pin sits on the flat portion of the reference bar 96. In the illustrated embodiment, pin 86 is designated to be the pin that sits in a notch. Because the pin 86 that sits in a notch is at a lower level than the pin that sits on the flat portion of the reference bar 96, the pin 86 is offset with respect to pin 84 in the vertical direction by the distance d. Referring to FIG. 7, this ensures that the diametrical axis of the chuck 22 would be vertical when the chuck 22 is hung against the vacuum coupling 20.

In operation, the X-Y positioner 24 controls the position and movement of the finger 66. The chuck 22 is lifted and moved by the finger 66 from a previous location to the vacuum coupling 20 at the desired processing station 14. At the desired processing station 14, the chuck 22 is lowered by the finger 66 such that the pin heads 88 hang over the reference bar 96 of the vacuum coupling 20. The precision stage 12 may need to be moved towards the chuck 22 (i.e., in the Z-direction) in order for the chuck 22 to be able to reach the vacuum coupling 20. As the pins 84 and 86 are lowered onto the reference bar 96, the beveled pin heads 88 act as cam surfaces against the edge of the reference bar 96. The resultant cam action between the beveled pin heads 88 and the reference bar 96 facilitates bringing the rear surface 83 of the chuck 22 towards the surface grooves 92 of the vacuum coupling 20. It is noted that the length of the stem 89 of each pin (i.e., the section from the rear surface 83 of the chuck 22 to the bevel of the pin head 88) is substantially the same dimension as the width of the reference bar 96. This is to ensure that when the stem 89 of the pin 86 is fully seated in one of the notches 98–100 and the stem 89 of the pin 84 is resting on the flat top surface of the reference bar 96, the rear surface 83 of the chuck 22 is close against the surface grooves 92 of the vacuum coupling 20. The chuck 22 is securely held against the vacuum coupling 20 by suction when a vacuum is applied. The pin heads 88 also provide safety against the chuck 22 falling from the vacuum coupling 20 in the event of a loss of vacuum.

The vacuum to the chuck 22 and vacuum coupling 20 may be supplied by any convenient source via a flexible tubing 77. The tubing leading to the chuck 22 and vacuum coupling 20 have been omitted from most of the drawings to simplify the drawings, with the exception of the exemplary section of tubing 77 shown in FIG. 5, for example, and the U-shaped sections shown in FIGS. 1 and 2. To avoid entanglement of the tubing to the chuck 22, the tubing 77 may be threaded through a passage in the finger 66 that has outlets 160 and 162. The U-shaped section of the tubing 77 seen in FIG. 1 and 2 is the result of bending the tubing between outlet 160 on the finger 66 and outlet 78 on the chuck 22. This U-shaped tubing section is of sufficient length such that after the chuck has been placed at a vacuum coupling 20, the finger 66 may be moved out of the way sufficiently without obscuring the exposure apparatus 18 and without pulling on the tubing 77. The length of tubing leading to the outlet 162 may be arranged to run along the body of the lifter 50 and away from the X-Y positioner 24 appropriately.

Referring to FIG. 6, within the space of the hollow center 94, a detector 102 may be positioned to detect a marking on the back of the chuck 22 to verify that the chuck 22 is positioned properly. If a clearance hole (not shown) is provided through the chuck 22, the detector 102 may also be configured to detect a marking on the back of the wafer 23, which may represent the type, size and/or other information about the wafer carried on the chuck, and/or the type of processing intended for the particular wafer.

Exemplary physical dimensions of the chuck 22 and vacuum coupling 20 in accordance with one embodiment of the invention is given below. Referring to FIG. 8, the width A of the vacuum coupling 20 is 80 mm and the height B of the vacuum coupling 20 is 88 mm. The distance C between the edge of the reference bar 96 and the center of the vacuum coupling 20 is 48 mm. Referring to FIG. 9A, the distances D and E between adjacent notches 98–100 on the reference bar 96 of each vacuum coupling are each 27 mm, with the notch 100 at a distance F of 7 mm from the centerline of the vacuum coupling 20. The angle K of each V-shaped notch is 90 degrees and the depth L of each notch is 2.8 mm. Referring to FIG. 7, the diameter G of the chuck 22 is 168 mm. The distance H between the two pins 84 and 86 on the chuck 22 is 40 mm. The distance I between the pin 86 and the center of the chuck 22 is 48 mm. The diameter J of each pin is 4 mm. The offset distance d is 2 mm. For a chuck and vacuum coupling having the foregoing dimensions, when pin 86 engages notch 99 and pin 84 rests on the reference bar 96 (see FIG. 9B), the chuck 22 is centered with respect to the vacuum coupling 20.

In view of the fact that production wafers may vary in thickness and that the seating of the wafers against the chuck 22 may not be perfect (e.g., due to wafer surface irregularities, dirt or other physical interference between the wafer and the chuck), it is necessary to calibrate the position of the wafer surface with respect to the chuck. Given this calibration, the position of the wafer surface with respect to the precision stage 12 can be determined. Further, given the known spacial relationship between the precision stage 12 and the exposure apparatus 18, the position of the wafer surface with respect to the exposure apparatus 18 can be easily determined and adjusted by the precision stage after the chuck 22 has been positioned at a process station 14.

Figure 2:
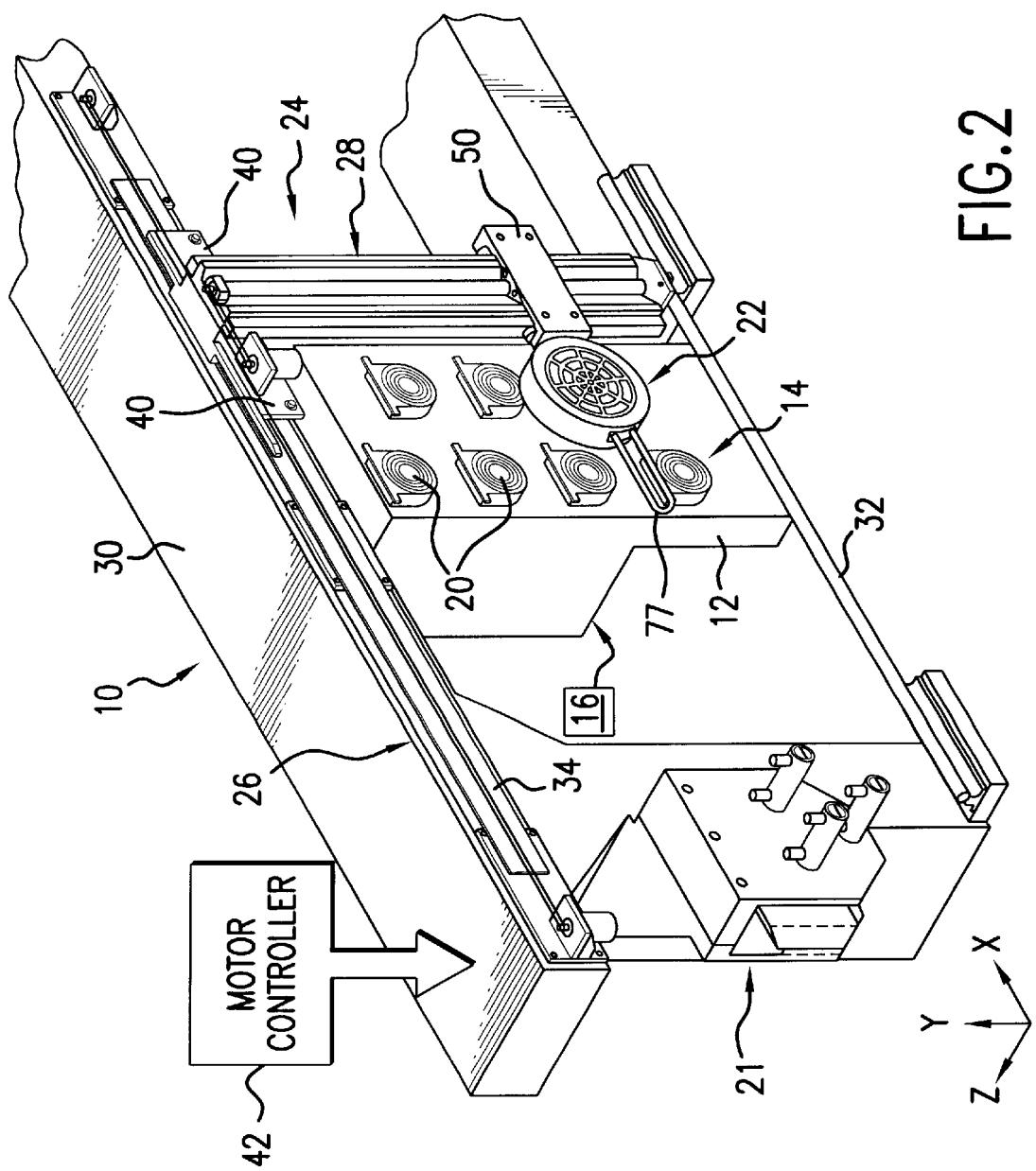
FIG. 2 is a simplified perspective view of the chuck transport mechanism with its lifter at the precision stage.
Figure 3:
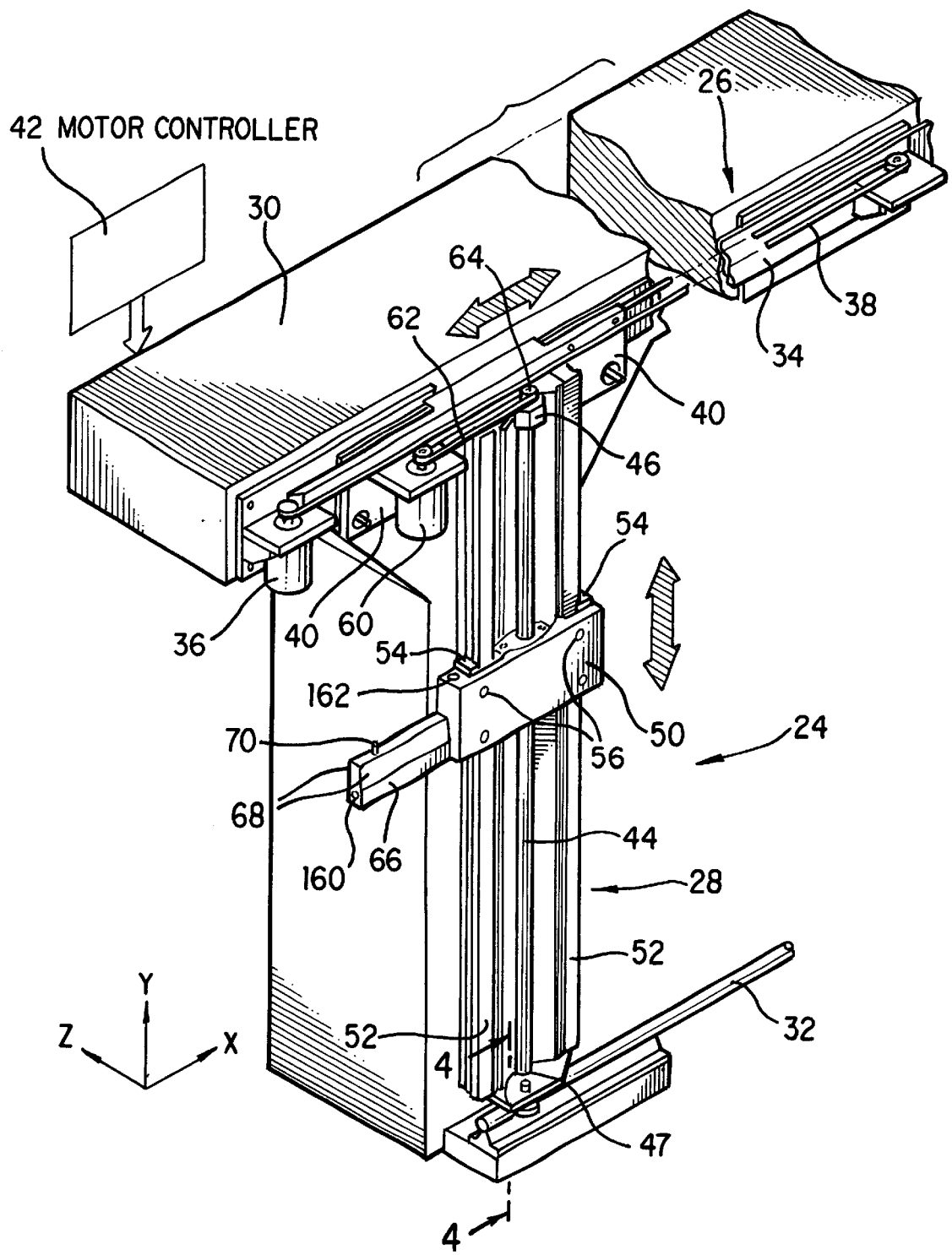
FIG. 3 is an enlarged view of the X-Y positioner of the chuck transport mechanism.
Figure 11:
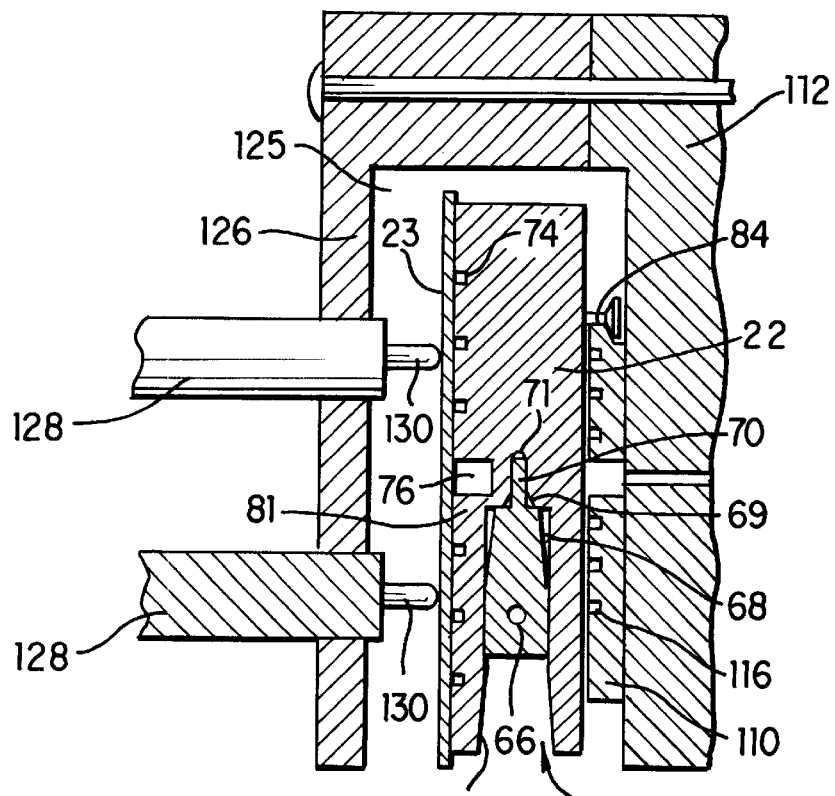
FIG. 11 is a sectional view at the calibration station taken alone line 11—11 in FIG. 10.
Figure 10:
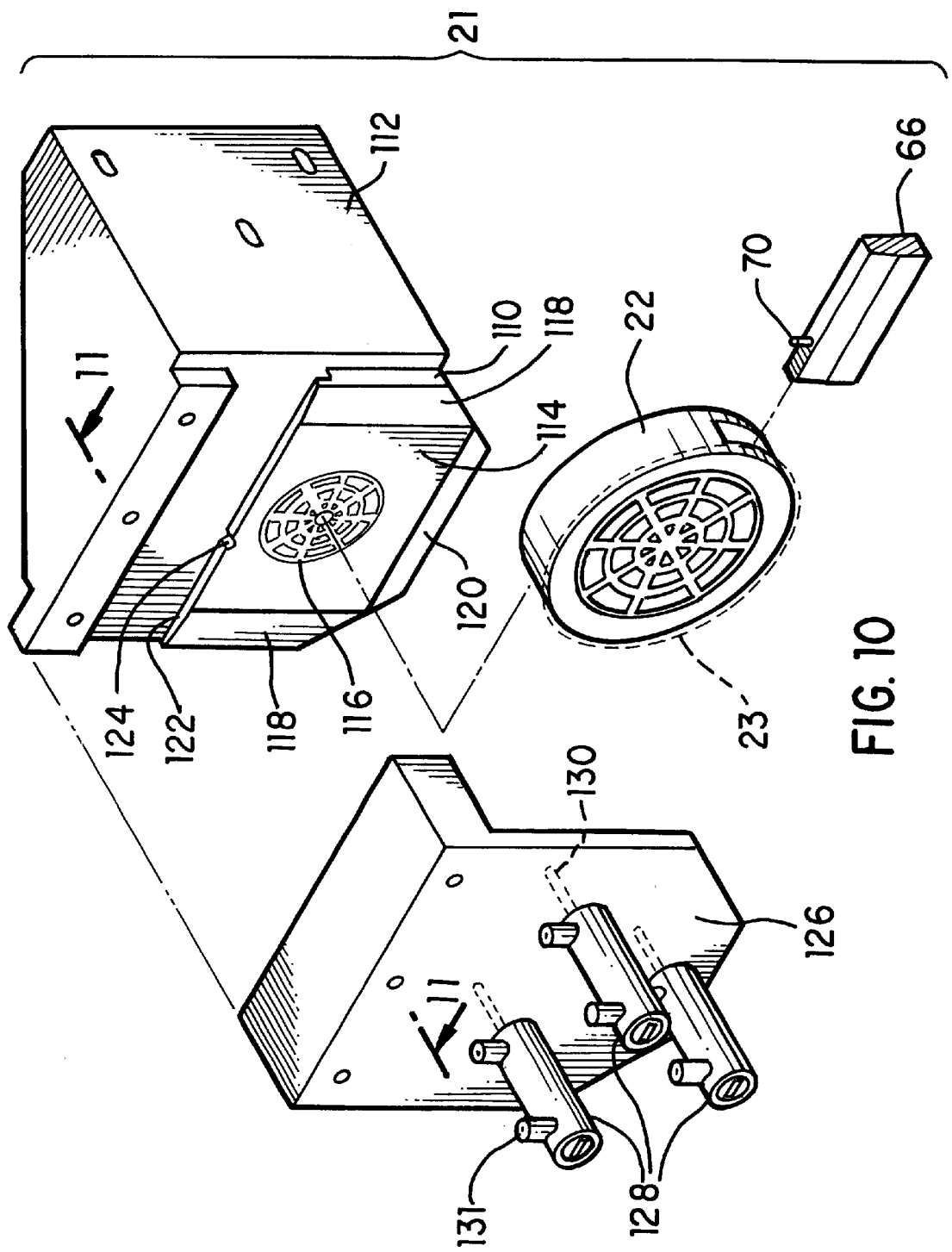
FIG. 10 is an exploded view of the calibration station.

Referring to FIGS. 10 and 11, the wafer surface is calibrated at a calibration station 21 located at one end of the frame 30 (see FIGS. 1 and 2), which is within reach of the finger 66 of the X-Y positioner 24 (see FIGS. 1 and 2). A calibration platform 110 is defined on the base 112 that is attached to the side of the frame 30. The calibration platform 110 has a flat surface 114 that has a network of surface grooves 116. The grooves 116 are for applying a vacuum, similar to the vacuum couplings 20. The side and bottom edges 118 and 120 of the flat surface are beveled. The top edge of the flat surface 114 defines a reference edge 122 having a single V-shaped notch 124. The notch 124 is located at the same distance from the center of the annulus of vacuum grooves 30 as the distance between the notch 99 and the center of the vacuum coupling 20. Thus, the chuck 22 will be centered on the calibration platform 110 when its pin 86 engages the notch on the reference edge 122.

A bracket 126 is mounted to the top section of the base 112. The bracket 126 and the calibration platform 110 define a space 125 therebetween that is sufficient for receiving a chuck 22. Several transducers 128 are attached to the back of the bracket 126 for determining the displacement and orientation of the surface of the wafer 23 as held on the chuck 22. The transducers 128 may be Linear Variable Differential Transformers ("LVDTs"), or other types of transducers that are suitable for precisely measuring relative displacements. The LVDTs 128 may be of the type having a probe 130 that is extended by air pressure and retracted by a built-in spring (e.g., Luca' Model No. 250MHR). A source of compressed air (not shown) is coupled to the LVDTs 128. The probes 130 of the LVDTs 128 extend through the bracket 126 into the space 125 between the bracket 126 and the calibration platform 110. To uniquely determine the location of the tilt of the plane of the wafer surface, three LVDTs 128 would be required, as illustrated in FIGS. 10 and 11.

The calibration platform 110 holds the chuck 22 in a similar manner as the vacuum coupling 20 holds the chuck 22 at a processing station 14. The finger 66 carries the chuck 22 to the calibration platform 110 to a position such that the pins 84 and 86 on the chuck 22 is just above the reference edge 122. The beveled surfaces 118 and 120 on the edge of the calibration platform facilitate guiding the chuck 22 into the space 125 between the bracket 126 and the calibration platform 110. The chuck 22 is then lowered such that the pins 84 and 86 engages the reference edge, with the pin 86 engaging the notch (the same pin that is designated to engage the notches at the processing stations). Vacuum is then applied to securely hold the chuck 22 against the calibration platform 110 by suction. Pressurized air is supplied to the LVDTs 128 to extend the probes 130 to contact the wafer surface. The relative displacement values of three points of the wafer surface are determined from the output of the LVDTs 128. These relative displacement values are used to calibrate the position and tilt of the wafer surface with respect to the chuck 22. At the completion of calibration, the LVDT probes 130 are retracted by releasing the pressurized gas at outlets 131. The chuck 22 is then lifted by the finger 66 to be positioned at a processing station 14 at the precision stage 12. The precision stage 12 relies on the calibration information to accurately position the wafer surface with respect to the exposure apparatus. Based on the calibration information, the precision stage 12 adjusts the position and tilt of the wafer surface.

Figure 12:
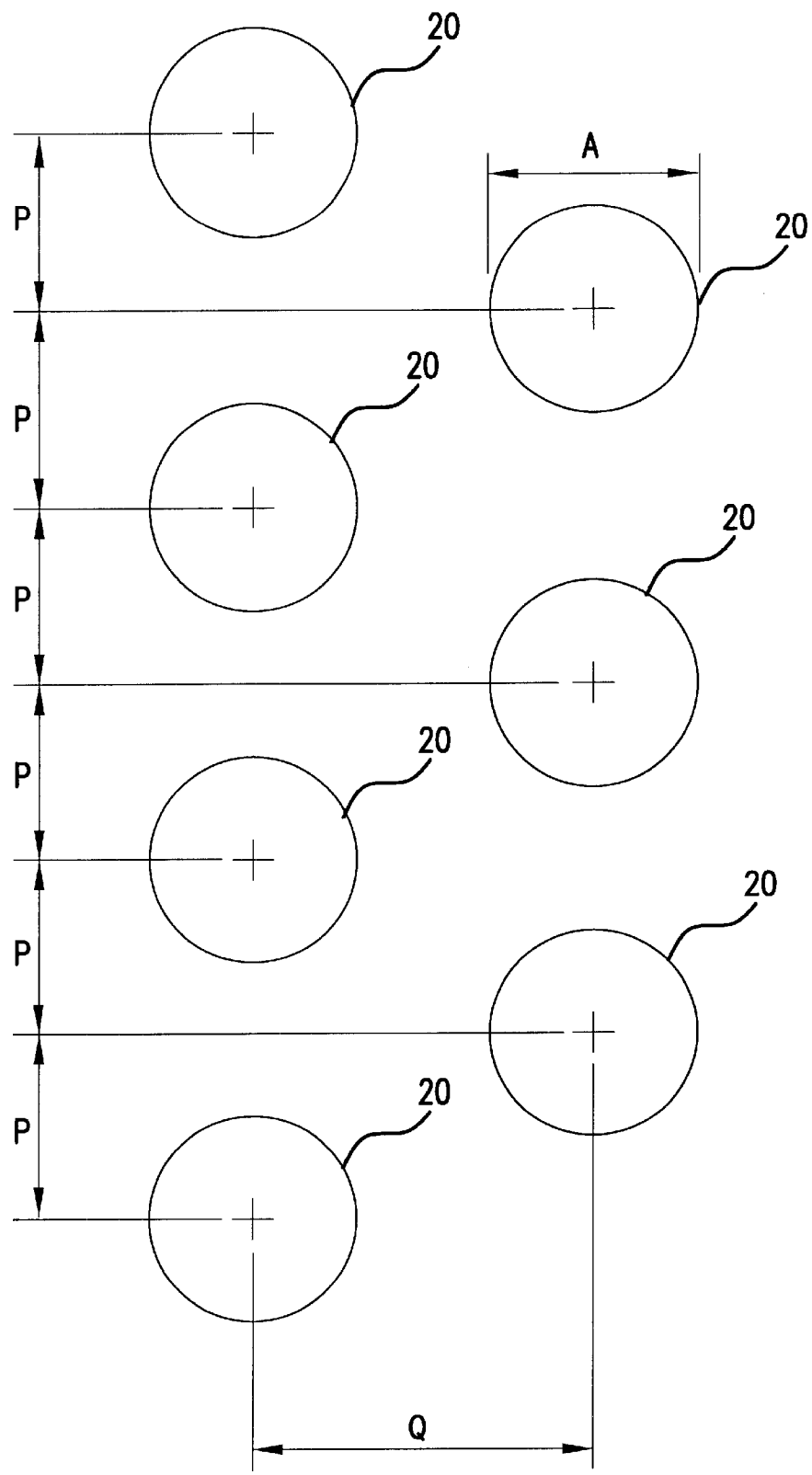
FIG. 12 shows the layout of the relative locations of the processing stations in accordance with one embodiment of the invention.
Figure 13:
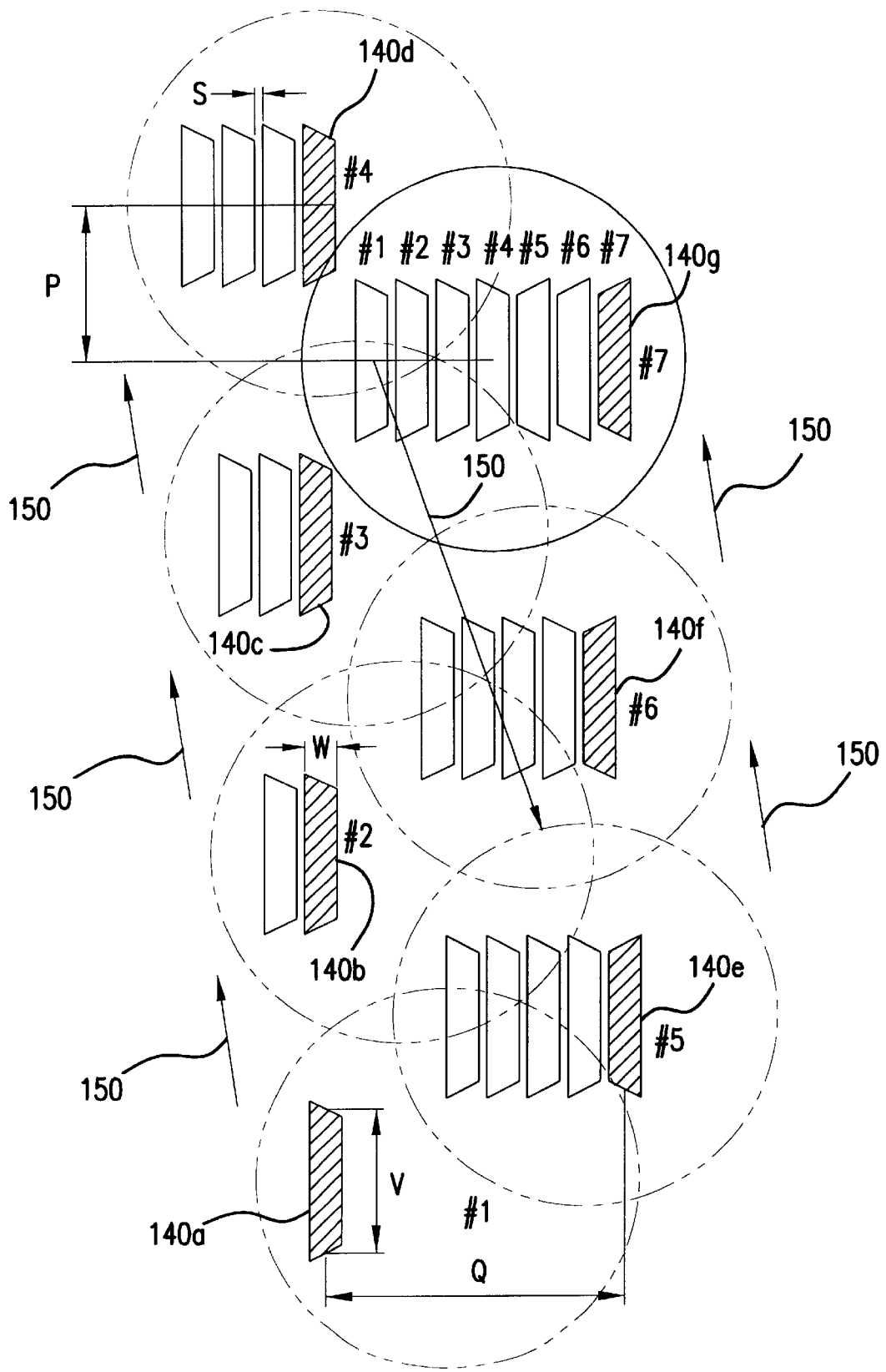
FIG. 13 illustrates the sequence of images of a type I exposure.

An example of a sequence of exposure on a wafer that can be carried out using the chuck transport mechanism 10 of the invention is illustrated in FIGS. 12 and 13. FIG. 12 illustrates the layout of the relative locations of the processing stations 14 as defined by the coupling 20, in accordance with one embodiment of the invention. FIG. 13 illustrates the fields exposed in accordance with the so-called Type I exposure sequence. Type I exposure is a series of in focus exposures, all on the same wafer 23. In this example, the wafer 23 is circular having a 175 mm diameter. Seven exposure fields 140a–g are exposed side by side on the wafer 23 in the sequence indicated by arrows 150. The width W of each exposure field 140a–g is 6 mm and the length V is about 80 mm. The separation S between adjacent fields is 2 mm. Thus, the centerlines of the first and last of the seven exposure fields are offset by a distance M of 54 mm from the center of the wafer 23. The placement of the fields 140a–g relative to each other is not critical. For the vacuum coupling 20 and the chuck 22 having the specific dimensions mentioned above and the exposure fields illustrated in FIG. 13, distance P is selected to be 80 mm and Q to be 140 mm. Based on these dimensions, there is no overlay of the exposure fields, as evident from FIG. 13.

To carry out the Type I exposure, the chuck transport mechanism 10 places the chuck 22 sequentially at each processing station 14 (as indicated by the direction of arrows 150) at the locations defined by the notches 98–100. The lateral (X) movement of the precision stage 12 further provides for offsets that are in between those offsets defined by the notches. For the example of the 168 mm diameter chuck and the 80 mm diameter vacuum coupling, the chuck can be mounted off-center to the exposure apparatus by up to plus and minus 42 mm. To make up the maximum 54 mm offset from the center of the wafer, the precision stage 12 need only be configured to have a maximum travel of plus and minus 12 mm in the X direction. Accordingly, the maximum travel of the precision stage 12 is kept to a minimum, thus reducing the structural complexity of the precision stage 12 otherwise required to achieve a larger range of travel.

The combination of the chuck offsets on the vacuum couplings 20 and the travel of the precision stage 12 provides for the required offsets from the optical axis of the projection optics to form the seven exposure fields 140a–g on the wafer as shown in FIG. 13. It is noted that additional notches may be predefined at the appropriate location on the reference bar 96 such that the locations of the chuck 22 could be indexed for the second to sixth exposure fields 140b–f without having to offset the precision stage 12 laterally. That is, there need not be gross lateral movements of the precision stage 12 to position the chuck for the second to sixth exposure fields 140b–f, with the exception of small movements that are necessary to align the wafer with respect to the projection optical system. The precision stage 12 only need to move the chuck 22 for the first and last exposure fields 140a and 140g, when the extra 12 mm offset is needed for each of such exposure fields 140a and 140g.

The advantages of the transport system of the invention can be readily appreciated from the foregoing example of the implementation of such a system for wafer processing. While the chuck transport system is relatively simple in design, its combination with the precision stage 12 allows precise positioning of the wafer with respect to the processing apparatus (e.g., projection mask exposure apparatus). As mentioned before, the precision stage is a component required in a wafer exposure system. The precision stage causes the projected image to be focused on the wafer and aligns the wafer with respect to the image of the projection mask. The relatively high precision mechanism of the precision stage 12 provides the fine positional adjustments of the wafer surface. The simple, relatively low precision transport mechanism provides instead relatively large stroke motions to move the chuck between exposure stations. The precision of the precision stage may be a factor of about 10 to 100 times higher than that of the transport mechanism.

The chuck transport system allows the use of a single chuck to hold the wafer for processing at multiple exposure stations. If the wafer alone is moved between exposure stations, then a chuck would have to be provided at each of the exposure stations. The additional chucks and their associate vacuum plumbing would increase the load on the precision stage. The increased load may hinder the ability of the precision stage to perform its functions, as well as reduce its precision. Further, if each exposure station were provided with a wafer chuck, this would require the wafer to be precisely positioned on these chucks using a high precision wafer transport mechanism and/or the displacement and tilt of the wafer surface calibrated at each station. It is noted that the precision stage adjusts the position of the wafer based on the calibration, or on the assumption that the wafer is correctly seated on the chuck and that the wafer is of a given controlled thickness. Hence, in order to reduce positioning errors between the precision stage and the wafer transport mechanism, the transport mechanism would have to be attached to the precision stage. However, the added weight of the transport mechanism may distort the precision stage, thus reducing its precision.

While the invention has been described with respect to the described embodiments in accordance there with, it will be apparent to those skilled in the art that various modifications and improvements may be made without departing from the scope and spirit of the invention. For example, the chuck may be configured to hold other types of work pieces, including planar substrates and non-planar work piece, without departing from the scope and spirit of the invention. The transport system of the invention may be adapted for carry out other types of processing, such as lithography and compact disc processing, using single or multiple processing stations. Accordingly, it is to be understood that the invention is not to be limited by the specific illustrated embodiments, but only by the scope of the appended claims.

What is claimed is:

1. A system for transporting and positioning a work piece at a station for processing, comprising:

a chuck means for securely holding the work piece;

a positioning means for moving the chuck means to and from the station;

coupling means at the station for securely holding the chuck means, said coupling means including indexing means for defining at least one unique location at which the chuck means is to be located; and a calibration means for calibrating the position of a work surface of the work piece with respect to the chuck means prior to placement of the chuck means at the station.

2. The system of claim 1, wherein the positioning means is configured to move the chuck means along at least first and second axes.

3. The system of claim 1, wherein the positioning means includes a non-gripping finger for interfacing with the chuck means whereby the positioning means is configured to move the finger thereby to lift and lower the chuck means at the station.

4. The system of claim 1, wherein the positioning means is configured to move the chuck means between two or more stations for processing the work piece.

5. The system of claim 1, wherein the chuck means includes suction means for securely holding the work piece.

6. The system of claim 3 wherein the chuck means includes a surface having a network of surface grooves for suction of a smooth surface of the work piece.

7. The system of claim 1, further comprising a precision stage that supports the coupling means, the precision stage is configured to move at least along an axis to precisely position the work piece for processing.

8. The system of claim 7, wherein the precision stage supports a plurality of coupling means defining a plurality of stations for processing the work piece, and wherein the positioning means is configured to move the chuck means between the stations.

9. The system of claim 1, wherein the indexing means includes first guiding means for facilitating locating, within a range of tolerance, a complementary feature on the chuck means such that when the chuck means is moved to the station, the chuck means is located at the unique location.

10. The system of claim 9, wherein the first guiding means includes at least one notch in a reference surface, and the complementary feature on the chuck means includes at least one pin that is sized to be received in the notch.

11. The system of claim 10, wherein the coupling means is configured to securely hold the chuck means by suction, the coupling means further includes second guiding means for facilitating positioning a rear surface of the chuck means against the coupling means for suction coupling.

12. A system for precise positioning a work piece for processing at a station, comprising:
chuck means for securely holding the work piece;
positioning means for moving the chuck means to and from the station, wherein the positioning means is configured to position the chuck at the station with a relatively low precision;
coupling means at the station for securely holding the chuck means, said coupling means including indexing means for defining at least one unique location at which the chuck means is to be located at the coupling means; and
a precision stage which supports the coupling means; said precision stage having at least one degree of freedom for positioning, with a relatively high precision, the work piece for processing at the station.

13. The system of claim 12, wherein the precision stage supports a plurality of coupling means defining a plurality of stations for processing the work piece, and wherein the positioning means is configured to move the chuck means between the stations.

14. A system for transporting and positioning a wafer for processing at multiple stations that are located in a substantially same plane on a stage, comprising:
a chuck for securely holding the wafer;
a positioning means for moving the chuck along one or more axes between the stations;
coupling means at each station for securely holding the chuck, the coupling means including indexing means for defining at least one unique location in which the chuck is to be located at the coupling means; and
a precision stage that supports the coupling means of the stations, wherein the precision stage is configured to move at least along an additional axis to precisely position the work piece for progressing.

15. A method for precisely positioning a work piece at a station for processing, comprising the steps of:
securely holding the work piece with a chuck means;
moving the chuck means to and from the station to position the chuck means, with a relatively low precision, at the station;
securely holding the chuck means with a coupling means;
indexing the coupling means to locate the chuck means to at least one unique location at the station;
supporting the coupling means by a precision stage having at least one degree of freedom; and
positioning the work piece at the station, with a relatively high precision, for processing.

16. A system for precise positioning a work piece for processing at a station, comprising:
a chuck having a holding surface to hold the work piece;
a positioning device having an actuator to move the chuck to and from the station, the positioning device being configured to position the chuck at the station with a relatively low precision;
a coupling device at the station that securely holds the chuck, said coupling device including an index that defines at least one unique location at which the chuck is to be located at the coupling device; and
a precision stage that supports the coupling device, said precision stage having at least one degree of freedom for positioning the work piece, with a relatively high precision, at the station for processing.

17. The system of claim 16 further comprising a plurality of projection optics that form exposure fields, the plurality of projection optics are supported by the coupling device.

* * * * *